United States Patent
Anderson et al.

(10) Patent No.: US 7,832,007 B2
(45) Date of Patent: Nov. 9, 2010

(54) METHOD OF MANAGING AND MITIGATING SECURITY RISKS THROUGH PLANNING

(75) Inventors: Kay S. Anderson, Washington, DC (US); Pau-Chen Cheng, Yorktown Heights, NY (US); Mark D. Feblowitz, Winchester, MA (US); Genady Grabarnik, Scarsdale, NY (US); Shai Halevi, Elmsford, NY (US); Nagui Halim, Yorktown Heights, NY (US); Trent R. Jaeger, Port Matilda, PA (US); Paul Ashley Karger, Chappaqua, NY (US); Zhen Liu, Tarrytown, NY (US); Ronald Perez, Mount Kisco, NY (US); Anton V. Riabov, Ossining, NY (US); Pankaj Rohatgi, New Rochelle, NY (US); Angela Marie Schuett, Columbia, MD (US); Michael Steiner, New York, NY (US); Grant M. Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/328,589

(22) Filed: Jan. 10, 2006

(65) Prior Publication Data

US 2007/0162976 A1 Jul. 12, 2007

(51) Int. Cl.
*H04L 29/00* (2006.01)

(52) U.S. Cl. .......................................... 726/22; 713/165
(58) Field of Classification Search ................... 726/25
See application file for complete search history.

(56) References Cited

U.S. PATENT DOCUMENTS

| 7,287,280 | B2 * | 10/2007 | Young ......................... 726/25 |
| 7,376,965 | B2 * | 5/2008 | Jemes et al. .................. 726/3 |
| 7,519,996 | B2 * | 4/2009 | Cain ............................ 726/23 |
| 2005/0004863 | A1 * | 1/2005 | Havrilak ....................... 705/38 |
| 2005/0065904 | A1 * | 3/2005 | DeAngelis et al. ............ 707/1 |
| 2005/0080720 | A1 * | 4/2005 | Betz et al. ..................... 705/38 |
| 2006/0253709 | A1 * | 11/2006 | Cheng et al. ................. 713/182 |
| 2009/0282487 | A1 * | 11/2009 | Anderson et al. ............ 726/25 |

OTHER PUBLICATIONS

Gilliam, David P., "Security Risks: Management and Mitigation in the Software Life Cycle", 2004, IEEE Computer Society, pp. 1-6.*

* cited by examiner

*Primary Examiner*—Matthew B Smithers
(74) *Attorney, Agent, or Firm*—Chau & Associates, LLC

(57) ABSTRACT

An exemplary method is provided for managing and mitigating security risks through planning. A first security-related information of a requested product is received. A second security-related information of resources that are available for producing the requested product is received. A multi-stage process with security risks managed by the first security-related information and the second security-related information is performed to produce the requested product.

20 Claims, 2 Drawing Sheets

METHOD OF MANAGING AND MITIGATING SECURITY RISKS THROUGH PLANNING

GOVERNMENT RIGHTS STATEMENT

This invention was made with Government support under Contract No.: H98230-04-3-0001 awarded by the U.S. Department of Defense. The Government has certain rights in this invention.

BACKGROUND OF THE INVENTION

1. Field of the Invention

The present invention relates generally to the field of security, and, more particularly, to managing and mitigating security risks through planning.

2. Description of the Related Art

Consider, for example, the following environment: a network of interconnected processing stations that produce one or more products by processing a plurality of primal entities, such as raw materials or information sources, supplied to the network. Exemplary processing stations may include businesses, manned workstations, factory machinery, software programs, agents, services, components, and the like. Exemplary primal entities may include, but are not limited to, business documents, machine parts, news feeds, data obtained from computer networks, and the like. While primal entities arrive into the system from the outside, the processing stations can produce new entities, called derived entities. In many such environments, the entities consumed or produced by the network as intermediate or final products can have value. A value of an entity (hereinafter referred to as "entity value") can include the following.

(1) The actual value of the entity. For example, the entity may be a physical object of monetary value.

(2) The additional value of the entity that can be lost from publicly disclosing the entity or releasing the entity to another party. For example, the entity may be a document containing trade secrets.

(3) A combination of (1) and (2) above. For example, the entity may be a valuable physical object that can be reverse engineered to determine trade secrets. Special security procedures may be utilized in such environments to prevent potential losses of entity value. If the delivery channels between the stations are not secure or trusted, we will model such channels as single-input, single-output stations connected to channel endpoints by trusted and secure channels. That is, although not so limited, we will make the assumption that channels are secure and trusted. Hence, in our model of the system, the processing stations are connected by trusted and secure channels. Therefore, the losses can occur either at the processing station-side (if the stations distribute the entities) or at the consumer-side (if the consumers of the product distribute the entities).

Various discretionary access control ("DAC") and mandatory access control ("MAC") security policies can be implemented in such systems. A widely-used approach for providing security to such environments is a component-based technology known as multi-level security (hereinafter "MLS"). Although MLS was created before the creation of the modern computer, it is widely used in computer systems to ensure security of information flows. More information and examples of MLS systems can be found in David E. Bell and Leonard J. LaPadula, "*Computer security model: Unified exposition and Multics interpretation*", Technical Report *ESD-TR*-75-306, The MITRE Corporation, Bedford, Mass., HQ Electronic Systems Division, Hanscom AFB, MA, June 1975, and in *Multilevel Security in the Department Of Defense: The Basics*" available from National Security Institute website, http://nsi.org/Library/Compsec/sec0.html, the disclosures of which are incorporated by reference herein in their entirety. MLS is currently implemented, for example, in the IBM® zSeries.

In a componentized system, such as MLS, each of the processing stations (i.e., components) is assigned a subject security label which determines the entities that the processing stations can process and output. Similarly, all entities that are processed or created by these processing stations also have a single object security label. The set of security labels forms a distributive lattice, and hence is at least partially ordered. The partial order provides a means for comparing the labels based on a dominance relation, such that for any label a subset of labels dominated by that label can be identified; however, the partial order does not guarantee that of any two labels one dominates the other.

Exemplary labels include MLS labels, traditionally defined as a combination of a secrecy level and security category set and integrity labels (e.g., Biba). When a label A dominates a label B in the distributive lattice, entities can flow from B to A without risk but not vice versa. MLS security policy requires that the subject label of the processing station dominate the labels assigned to each of the station's input entities. Further, the labels assigned to station's output entities must dominate the subject label of the processing station.

A security policy generally includes three (3) classes of rules.

(1) Each processing station cannot accept any input entity that has a higher object security label than the processing station's subject security label.

(2) Each processing station must label all derived entities that it produces with an object security label that dominates the subject label of the processing station. This rule ensures that entities are not incorrectly relabeled with lower security levels, thereby avoiding loss of entity value. However, special-purpose trusted processing stations, after a mandatory review of their operation, can be authorized to violate this rule and to assign lower security labels to their output with respect to their inputs without incurring unacceptable security risk. The review procedure is determined by the application and security policy guidelines, as well as by the nature of the processing stations, and may include, for example, software code review and certification, engineering design evaluation, and the like.

(3) The recipient of the entities produced by the network of processing stations is also assigned a subject security label. Therefore, the labels of the derived entities produced by the processing stations must be dominated by the subject security label of the recipient based on rule (1) above.

Violation of any of the rules (1), (2), or (3), except those by special-purpose trusted processing stations according to the permissions of the special-purpose trusted processing stations, result in security risk. That is, if the rules are violated, there exists a possibility that the loss of protected entities will occur.

As web services gain greater acceptance on the Internet, and as an increasing number of applications are relying on components that provide varying but formally-described services, the number of possible alternative service compositions begins to exceed the capabilities of manual analysis (which is currently performed by human analysts). Therefore, methods for automatically selecting and interconnecting these components become of greater importance. Examples of such methods can be found in J. Blythe, E. Deelman, Y. Gil, K. Kesselman, A. Agarwal, G. Mehta and K. Vahi, *"The Role of Planning in Grid Computing"*, ICAPS 2003; T. Kichkaylo, A. Ivan, V. Karamcheti, *"Constrained Component Deployment in Wide-Area Networks Using AI Planning Techniques"*, IPDPS 2003; P. Doshi, R. Goodwin, R. Akkiraju, K. Verma: *Dynamic Workflow Composition using Markov Decision Processes, Proceedings of IEEE Second International Conference on Web Services*, June, 2004 and B. Srivastava. *A Decision-support Framework for Component Reuse and Maintenance in Software Project Management, CSMR'04*, and references therein, the disclosures of which are incorporated by reference herein in their entirety. Generally, existing methods for automatically selecting and interconnecting components do not systematically consider security.

SUMMARY OF THE INVENTION

In one aspect of the present invention, a method is provided. The method includes the steps of receiving a first security-related information of a requested product; receiving a second security-related information of resources that are available for producing the requested product; and performing a multi-stage process with security risks managed by the first security-related information and the second security-related information to produce the requested product.

In another aspect of the present invention, a machine-readable medium having instructions stored thereon is provided. The method includes the steps of comprising the steps of receiving a first security-related information of a requested product; receiving a second security-related information of resources that are available for producing the requested product; and performing a multi-stage process with security risks managed by the first security-related information and the second security-related information to produce the requested product.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
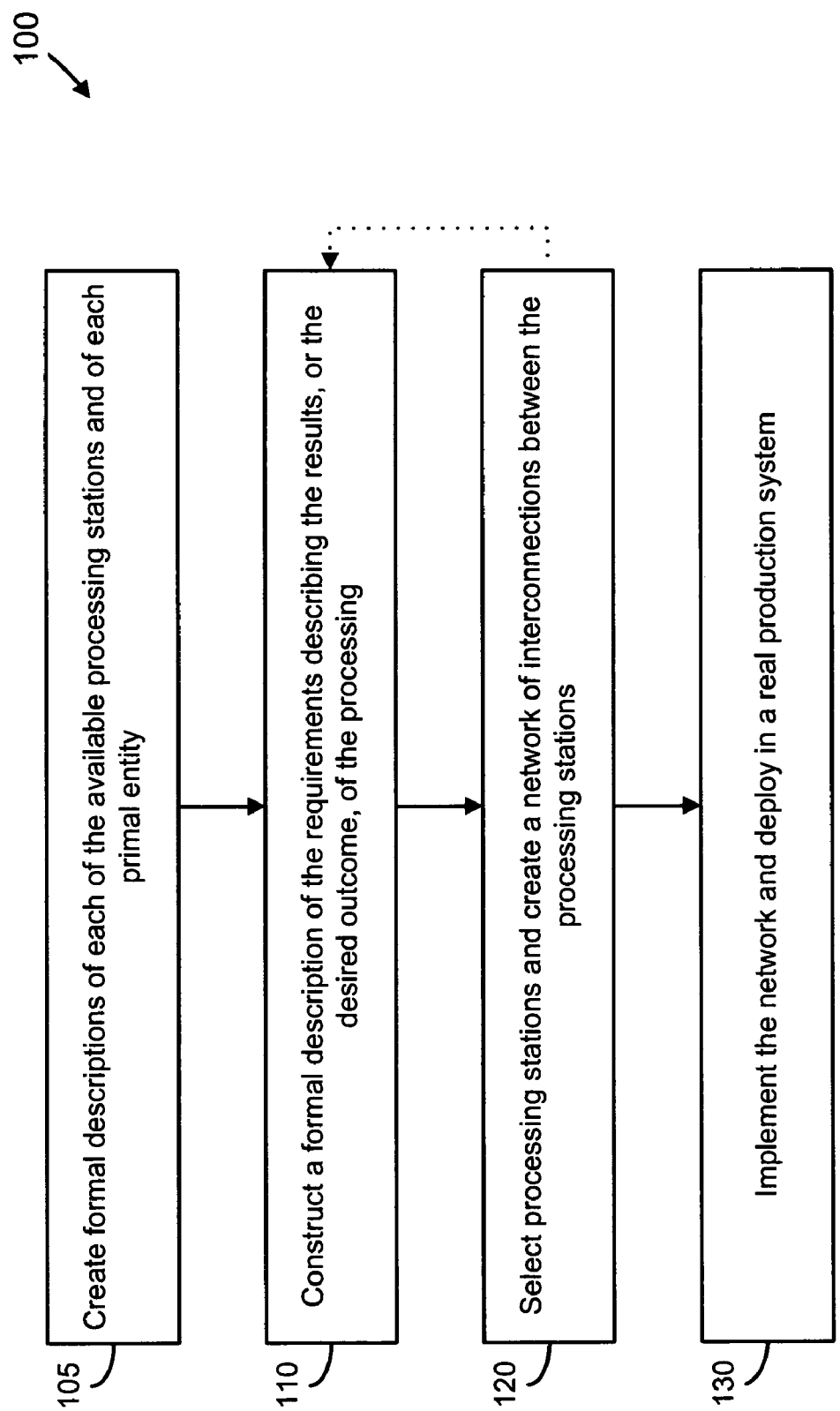
FIG. 1 depicts a method of constructing and deploying a system of processing stations is shown, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We describe novel methods for automatically managing and mitigating security risks in a network of processing stations (i.e., workflows) using planning techniques based on descriptions of processing stations and on the formal description of the entities that must be produced by the workflow (i.e., products) to satisfy customer requirements. The required products are produced by the network, while the overall security risk is minimized or kept below a predefined value (i.e., a budget). Alternative methods can also be used to modify existing networks (i.e., workflows) to reduce the overall security risk. Embodiments of the present invention may be used in, for example, Semantic Web, web services, workflow composition and component-based software.

More specifically, we address the following practical requirements arising in the environment of security risk mitigation.

(1) Minimizing the overall security risk, or maintaining the overall risk at or below the specified maximum level while (a) creating new specifications of networks of processing stations from scratch, (b) selecting the processing stations to use in the network, and (c) specifying the flow of entities between the processing stations, such that these networks produce entities that satisfy consumer requirements.

(2) Modifying previously-constructed networks of processing stations to reduce (i.e., mitigate) the overall risk.

Compared to existing manual or single-level security methods, the present invention increases the speed of the analysis of risk estimation, and improves the quality and the precision of the risk estimation. The present invention further provides greater flexibility that enables the processing of multiple security levels. The present invention contributes to the improved quality of the resulting product produced by the system due to automatic insertion of trusted processing stations: the automatic system can analyze more candidate workflows for achieving the best quality while satisfying security policy constraints compared to human experts composing the workflow manually. Additionally, the present invention may be used to construct verifiably secure, largescale systems that are composed of hundreds, or even thousands of processing stations, which cannot be done manually by analysts.

We now describe the present invention in greater detail. It should be appreciated that with regards to recording, tracking or verifying the labels assigned to the entities (i.e., objects) or to the processing stations (i.e., components), any of a variety standard implementations (e.g., MLS) may be used as contemplated by those skilled in the art. It should further be appreciated that with regards to security label specification, any of a variety of standard implementations may be used as contemplated by those skilled in the art. For example, the security label specification (which includes secrecy levels and categorization) used in MLS, and the Biba integrity levels (with the signs reversed) can be used in the context of the present invention.

Referring now to FIG. 1, a method 100 of constructing and deploying a system of processing stations is shown, in accordance with one exemplary embodiment of the present invention. The formal descriptions of each of the available processing stations and of each primal entity are created (at 105). The formal descriptions may be entered into a database or a knowledgebase computer system for simplified search and management of the data. The formal descriptions may include security properties, as well as properties specific to describing the content of entities and the functionality of the processing stations.

The user constructs (at 110) a formal description of the requirements describing the results, or the desired outcome, of the processing. The description of user requirements includes a definition of the maximum-accepted security risk level. This level may be fixed by a system-wide security policy, or chosen by the user from the range allowed by the policy.

After the descriptions of processing stations, primal entities, and user requirements become available, processing stations are selected (at 120) and a network of interconnections between the processing stations is created. The network of processing stations is created by matching the output of one station (or a primal entity) to the input of another station (or primal entity), and specifying which outputs in the network are the final outputs that contain the product.

The network is implemented (i.e., deployed) (at 130) and used in a real production system. It should be appreciated that steps 110, 120 can be repeated several times (shown by the dotted line of FIG. 1), constructing alternate composition (i.e., network) of processing stations that satisfy different objectives.

Figure 2:
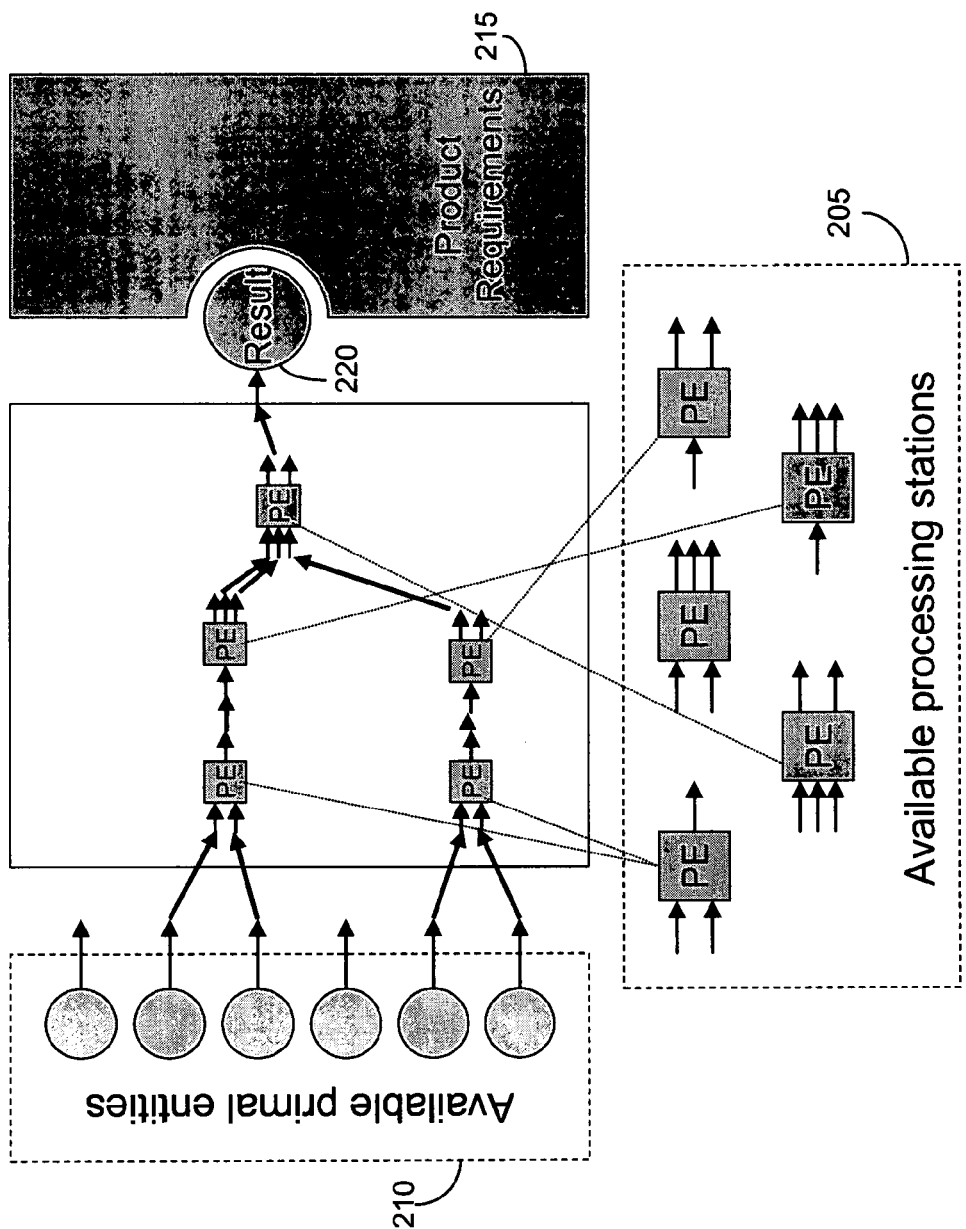
FIG. 2 depicts a block diagram illustrating a process of constructing a network of processing stations based on (a) information about the processing stations, (b) information about primal entities and (c) product requirements, in accordance with one exemplary embodiment of the present invention.

Referring now to FIG. 2, a block diagram is shown illustrating the process of constructing a network of processing stations 205 based on (a) information about the processing stations 205, (b) information about primal entities 210 and (c) product requirements 215. The result 220, produced by the network, must match the product requirements 215. The network comprises a selection of processing stations 205, primal entities 210, and interconnections between the processing stations 205 and between primal entities 210 and processing stations 205.

In the area of AI planning the classical planning problem, which as also called deterministic planning, is represented as follows. The planning problem is a problem finding any valid plan or any optimal plan. The plan is a sequence of actions. It is assumed that when the actions are applied they change the state of the world of the corresponding planning domain. The state of the world before or after applying each action is described by predicates. To apply planning algorithms, one generally describes (e.g., in a form of predicates) an initial state, a goal state, conditions for applying each of the possible operators to world state, and the effects (i.e., changes to the predicate values) of each operator. An overview of AI planning methods can be found in J. Rintanen and J. Hoffmann, *An overview of recent algorithms for AI planning, Künstliche Intelligenz*, (2):5-11, May 2001.

In one exemplary embodiment, the state of the world is described by a set of available entities, and each planning action corresponds to either a primal entity or a processing station in the network. A precondition for using the processing station may be that entities required in each of inputs of the station are available in accordance with a formal description of the processing station. The effects of using a primal entity or a processing station are those of making the produced entities available for further processing. Initially, no entities are available, and the primal entities can be added to the network without any preconditions. The goal state is described as a set of entities that comprise the product.

The exemplary embodiments described herein incorporate security considerations in planning. We assume the security policy follows a labeling model similar to MLS. The following policy helps to manage security risk during planning:

1. Each entity produced within the network of processing stations and each primal entity used in the system is annotated with a security label. The security label specifies which subjects can receive the entity.
2. The set of security labels of the primal entities are provided to the planning system.
3. Subject security label can be specified for each of the processing stations. If it is not specified, the maximum label, i.e. the label allowing all access, is assumed.
4. The security label is specified for the abstract consumer (i.e., a type of subject) of the final product: any entity produced by the network of processing stations must require security label dominated by that of the consumer.
5. During planning, the security label of each entity produced by a processing station is computed as a function of the labels corresponding to the entities supplied as an input to that processing station, using one of the two alternative methods:
   i. Normally, the security label of the entities produced by the processing station is the union of security labels of the input entities. The union of the labels is a minimal label that dominates every label in the set.
   ii. A processing station can be certified to assign to the output entities labels that are lower than those computed in (5.i) above. This certified processing station is referred herein as a special-purpose processing station.

In one exemplary embodiment, the assignment of labels to produced entities (i.e., 5.i and 5.ii above) is expressed as the effects of an action corresponding to a processing station. The labels of primal entities (2) are expressed as effects of including primal entities in the network of processing stations. The security label requirements (3) are specified as preconditions, and requirements in (4) are specified as goal specification. It becomes readily apparent to one skilled in the art that the labels are computed according to MLS rules. If the planner finds a plan that satisfies all of the preconditions and the goal specification, the MLS security policy will be enforced. Using the encoding of the planning problem and the security policy described in greater detail above, planning methods can be used for automatically creating networks of primal entities and processing stations. Such networks produce the required output while minimizing securities risks.

Solely for purposes of illustration, we now consider an exemplary instance of the planning problem with managed security risk. Consider that all entities in an environment are assigned unique names, and each processing station can be described as a transformation $S:(N_{in},T_{in}) \rightarrow (N_{out},T_{out})$, where S is the identifying name of the processing station, $N_{in}$ is the name of the entity consumed by the processing station, $N_{out}$ is the name of the entity produced by the processing station, $T_{in}$ is an integer between 1 and 5, corresponding to the security label of the processing station, and $T_{out}$ is the security label requirement assigned to the produced entity $N_{out}$. If $T_{out}$ is specified as * (i.e., a star), then the rule 5.i, described in greater detail above, applies, and the output security label assigned to the produced entity is equal to the actual security label of the consumed entity (which can be less or equal to $T_{in}$).

Solely for the sake of simplicity, we assume that each station accepts a single entity and produces single entity. Further, although not so limited, we assume that trust levels are specified by numbers. It should be appreciated, however, any number of entities with complex properties can be consumed and produced by stations (e.g., in web services composition applications), and any trust specification can be used, as long as partial order between the trust levels can be defined. For example, a secrecy-category set combination from a MLS model can be used to describe trust levels.

Consider, for example, four entities, named A, B, C and D. Secrecy labels contain a single number. Secrecy levels are defined similarly to secrecy level in the MLS model. We assume the following about processing stations S1, S2, S3 and S4:

S1: (A,3)→(B,*)
S2: (B,3)→(C,2)
S3: (C,3)→(D,*)
S4: (B,3)→(D,*)

Station S1 expects on input the entity A with a secrecy level of at most 3. Stations S2 and S4 expect on input the entity B, and station 53 expects on input the entity C. Stations S2, S3 and S4 each expect a secrecy level of at most 3. Station S1 produces entity B with a secrecy level that is determined by the default rule (i.e., the *-rule). Station S2 produces entity C, and stations S3 and S4 produce entity D. Under the default rule, the secrecy level of output is the maximum of input secrecy levels. As shown above, every processing station except for station S2 follows default rule. In contrast, station S2 changes the secrecy level of output to 2, if the input level is above 2.

We further assume that A is a primal entity of security label 3, and that no other primal entities exist. We also assume that entity D is required to be produced for the consumer with a security label 2. It should be noted that S2 is a special-purpose processing station defined in accordance with the rule 5.ii above, and in practice such station will require a review to certify that it is allowed to reduce security label requirements.

As we described above in general terms, the problem of constructing a network of processing stations can be described for an AI planning algorithms using actions and predicates. However, in this simple example all legal networks of processing stations can be examined. The network is legal, if the input of processing station is linked to the primal or derived entity of corresponding type $N_{in}$, and the label of the input entity is dominated by the subject label of the processing station $T_{in}$. By considering all possible combinations of processing stations and their interconnections (i.e., an exhaustive search method), the planner will detect that there are two possible sequences of processing stations that produce entity D, the sequences {S1→S4} and {S1→S2→S3}. However the network {S→S4} produces entity D with security label 3, and {S1→S2→S3} produces entity D with security label 2, because the special-purpose operation S2 has been applied to filter our valuable content during processing.

Since the consumer's security label is 2, the planner will return the network {S1→S2→S3}, which minimizes the security risk. The planner can also return a list of plans to produce D. The plans may be ordered in increasing security labels, which implies increasing security risks.

An example of using planning software (i.e. planners) for security planning will now be described. In particular, the planning problem described above can be formulated in Planning Domain Definition Language ("PDDL") and submitted to one of available planners. See, for example, M. Ghallab and A. Howe and C. A. Knoblock and D. McDermott, "*PDDL. The planning domain definition language.*", *Yale Center for Computational Vision and Control*, 1998, DCS TR-1165, which is incorporated herein by reference in its entirety. PDDL is a de-facto standard formulation for planning problems.

An exemplary PDDL representation of the planning problem is given below. This representation specifies the security properties of entities and processing stations, together with other properties needed for ensuring that the query (i.e., a request for D) is answered correctly. Without such specification, the existing planners will be unable to take security risk considerations into account.

By PDDL convention, the formulation includes two files: a domain definition file and a problem definition file. This formulation can be parsed and solved by most planners supporting PDDL. Since we use the conditional effects feature of PDDL, only the planners supporting this feature will accept these files as input. Metric-FF is one example of a planner that accepts this input. More details on Metric-FF can be found in J. Hoffmann, "*The Metric-FF Planning System: Translating 'Ignoring Delete Lists' to Numeric State Variables*", *Journal of AI Research*, 2003, vol. 20, pages 291-341, which is incorporated herein by reference in its entirety. The source code of Metric-FF is publicly available for download from Metric-FF homepage, http://www.mpi-sb.mpg.de/~hoffmann/metric-ff.html.

The domain definition file will now be provided.

```
;; Domain definition file domain .pddl
(define (domain SecurityExampleDomain)
    (:requirements :strips)
;; Define all predicates that can be used in
describing the world
;; We use 2 types of predicates. The first type,
;; named (entity-X-exists) indicates that entity X is
;; available for processing. The second type is used to
;; specify the secrecy level of information. For
example,
;; (secrecy-C-below3) means that the secrecy level of
;; entity C is 2 or 1 (below 3) . In defining the
operators
;; for every entity X we make sure that consistency is
;; preserved, i.e. whenever (secrecy-X-below3)
evaluates to true,
;; (secrecy-X-below4) also evaluates to true.
    (:predicates
        (entity-A-exists)
        (entity-B-exists)
        (entity-C-exists)
        (entity-D-exists)
        (secrecy-A-below2)
        (secrecy-A-below3)
        (secrecy-A-below4)
        (secrecy-B-below2)
        (secrecy-B-below3)
        (secrecy-B-below4)
        (secrecy-C-below2)
        (secrecy-C-below3)
        (secrecy-C-below4)
```

-continued

```
      (secrecy-D-below2)
      (secrecy-D-below3)
      (secrecy-D-below4)
   )
;; Action S1 implements the following processing:
;;    S1: (A, 3) -> (B, *)
 (:action S1
   :parameters( )
   :precondition (and (entity-A-exists) (secrecy-A-
below4))
   :effect (and (entity-B-exists)
        (secrecy-B-below4)
        (when (secrecy-A-below3) (secrecy-B-
below3))
        (when (secrecy-A-below2) (secrecy-B-
below2))
        )
 )
;; Action S2 implements the following processing:
;;    S2: (B, 3) -> (C, 2)
;; (S2 is a trusted component in terms of MLS model,
because
;;   the secrecy of its output is less than that of
input)
   (:action S2
   :parameters( )
   :precondition (and (entity-B-exists) (secrecy-B-
below4))
   :effect (and (entity-C-exists)
        (secrecy-C-below4)
        (secrecy-C-below3)
        (when (secrecy-B-below2) (secrecy-C-
below2))
        )
   )
;; Action S3 implements the following processing:
;; S3: (C, 2) -> (D,*)
   (:action S3
   :parameters( )
   :precondition (and (entity-C-exists) (secrecy-C-
below3))
   :effect (and (entity-D-exists)
        (secrecy-D-below4)
        (secrecy-D-below3)
        (when (secrecy-C-below2) (secrecy-D-
below2))
        )
   )
;; Action S4 implements the following processing:
;;    S4: (B, 3) -> (D,*)
   (:action S4
   :parameters( )
   :precondition (and (entity-B-exists) (secrecy-B-
below4))
   :effect (and (entity-D-exists)
        (secrecy-D-below4)
        (when (secrecy-B-below3) (secrecy-D-
below2))
        (when (secrecy-B-below2) (secrecy-D-
below2))
        )
   )
) ;; End of SecrecyExampleDomain definition
```

The problem definition file will now be provided.

```
;; Problem definition file problem.pddl
(define (problem SecurityExampleProblem)
   (:domain SecurityExampleDomain)
;; Initial state specifies that entity A with secrecy
level 3
;; is available initially
   (:init
      (entity-A-exists)
```

```
      (secrecy-A-below4)
      )
;; The goal is to produce entity D with secrecy level
2 or lower,
;; since the recepient requesting the entity only has
clearance
;; for secrecy level 2 information, but not higher.
;; (in this formulation only zero risk can be
tolerated)
   (:goal (and
      (entity-D-exists)
      (secrecy-D-below3))
      )
) ;; End of SecurityExampleProblem definition
```

The Metric-FF planner, when given these two files shown above, produces the following output (irrelevant progress information not shown):

```
ff: found legal plan as follows
step    0: S1
        1: S2
        2: S3
```

The Metric-FF planner finds the plan {S1→S2→S3}, which indeed produces entity D with secrecy level 2. The plan {S1→S2→S3} is the only valid plan for this problem formulation.

It should be appreciated that more sophisticated methods or PDDL formulations can be used to implement methods that minimize risk, instead of finding plans that have no security risk, as in our example.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A non-transitory computer readable medium embodying instructions executable by a processor to perform a method of managing and mitigating security risks, comprising:

creating a description of a plurality of available processing stations and primal entities, wherein the description comprises at least one of security properties, properties specific to describing content of the primal entities and a functionality of the available processing stations;

receiving a description of product requirements comprising a definition of a maximum accepted security risk level;

receiving a system of security labels specifying respective object security labels assigned to the primal entities and respective subject security labels assigned to the available processing stations, wherein the available processing stations cannot accept ones of the primal entities having a higher object security label than the subject security label of the respective available processing stations;

creating a network using the description of the available processing stations, the description of the primal entities and the description of product requirements constrained by the system of security labels, comprising a selection of the available processing stations, a selection of the primal entities, a plurality of interconnections between selected processing stations and a plurality of interconnections between selected primal entities and the selected processing stations; and processing entities in the network according to a development plan created pursuant to the description of the available processing stations, the description of the primal entities and the description of product requirements, wherein the development plan comprises instructions for producing a product having an overall security risk level below a predefined value.

2. A method, comprising:

executing instructions by a processor to perform the method, the method further comprising:

receiving a first security-related information of a requested network based service;

receiving a second security-related information of resources that are available for producing the requested network based service; and performing a multi-stage process with security risks managed by the first security-related information and the second security-related information to configure a plurality of processing stages to provide the requested network based service.

3. The method of claim 2, wherein receiving security-related information of the requested network based service, comprises:

receiving security-related information of the requested network based service from at least one of a requester requesting the requested network based service or a security policy.

4. The method of claim 2, wherein receiving the first or the second security-related information of the requested network based service, comprises:

receiving at least one primal input for producing the requested network based service; and receiving security-related information of the at least one primal input.

5. The method of claim 2, wherein receiving the first or the second security-related information of the requested network based service, comprises:

receiving security-related information of at least one of the processing stages of the multi-stage process.

6. The method of claim 2, wherein receiving the first or the second security-related information of the requested network based service, comprises:

receiving security constraints of the at least one of the processing stages of the multi-stage process.

7. The method of claim 2, wherein performing the multi-stage process with security risks managed by the security-related information to produce the requested network based service, comprises: performing a multi-stage process with security risks managed by the security-related information to produce the requested network based service using at least one primal input.

8. The method of claim 2, wherein performing the multi-stage process with security risks managed by the security-related information, comprises:

performing a multi-stage process with security risks minimized.

9. The method of claim 2, wherein performing the multi-stage process with security risks managed by the security-related information, comprises:

performing a multi-stage process with security risks mitigated.

10. The method of claim 2, wherein performing the multi-stage process with security risks managed by the security-related information to produce the requested network based service, comprises:

creating a multi-stage process with security risks managed by the security-related information; and producing the requested network based service using the created multi-stage process.

11. The method of claim 2, wherein performing the multi-stage process with security risks managed by the security-related information to produce the requested network based service, comprises:

modifying an existing multi-stage process to manage security risk utilizing the security-related information; and producing the requested network based service using the modified multi-stage process.

12. The method of claim 2, wherein the security-related information comprises a security risk tolerance requirement, and wherein the step of performing the multi-stage process satisfies the security risk tolerance requirement.

13. The method claim 12, wherein the at least one security risk tolerance requirement comprises no risk.

14. The method of claim 12, wherein the at least one security risk tolerance requirement comprises a numerical quantity.

15. The method of claim 2, wherein receiving security-related information, comprises: receiving secrecy labels from a Multi-level Security (MLS) model.

16. The method recited in claim 15, wherein the processing stages in the multi-stage process are each assigned a security constraint that requires the secrecy labels of output products of the processing stages be at least the least upper bound of the secrecy labels of input products of the processing stages.

17. The method of claim 2, wherein receiving security-related information, comprises: receiving secrecy labels from a Fuzzy Multi-level Security (FuzzyMLS) model.

18. The method recited in claim 17, wherein the processing stages in the multi-stage process are each assigned a security constraint that requires the secrecy labels of output products of the processing stages be at least the least upper bound of the secrecy labels of input products of the processing stages.

19. The method of claim 2, wherein receiving security-related information, comprises: receiving integrity labels from a Biba model.

20. The method recited in claim 19, wherein the processing stages in the multi-stage process are each assigned a security constraint that requires the integrity labels of the output products of the processing stages be the lower bound of the integrity labels of the input products of the processing stages.

* * * * *